United States Patent
Oh et al.

(10) Patent No.: US 9,625,639 B2
(45) Date of Patent: Apr. 18, 2017

(54) OPTICAL MEMBER AND DISPLAY DEVICE INCLUDING THE SAME

(71) Applicant: LG INNOTEK CO., LTD., Seoul (KR)

(72) Inventors: Jeong Taek Oh, Seoul (KR); Sun Hwa Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/875,191

(22) Filed: Oct. 5, 2015

(65) Prior Publication Data
US 2016/0025920 A1 Jan. 28, 2016

Related U.S. Application Data

(63) Continuation of application No. 14/110,387, filed as application No. PCT/KR2011/009234 on Nov. 30, 2011, now Pat. No. 9,223,081.

(30) Foreign Application Priority Data

Apr. 5, 2011 (KR) .................. 10-2011-0031334

(51) Int. Cl.
*F21V 9/16* (2006.01)
*F21V 8/00* (2006.01)
*G02B 1/11* (2015.01)
*G02F 1/1335* (2006.01)

(52) U.S. Cl.
CPC .............. *G02B 6/0053* (2013.01); *G02B 1/11* (2013.01); *G02B 6/0003* (2013.01); *G02B 6/005* (2013.01); *G02F 1/133617* (2013.01); G02F 2001/133614 (2013.01); G02F 2201/38 (2013.01)

(58) Field of Classification Search
CPC ........ G02B 6/0053; G02B 1/11; G02B 6/003; G02B 6/005; G02F 1/133617
USPC .................................... 362/84; 313/501, 506
See application file for complete search history.

(56) References Cited

U.S. PATENT DOCUMENTS

| | | | |
|---|---|---|---|
| 3,922,068 A | 11/1975 | Uetsuki | |
| 6,344,261 B1 | 2/2002 | Kaule et al. | |
| 6,437,311 B2 | 8/2002 | Tsang | |
| 7,196,354 B1 | 3/2007 | Erchak et al. | |
| 7,402,832 B2 * | 7/2008 | Lee .................. | B82Y 10/00 257/17 |
| 7,577,318 B2 | 8/2009 | Mönch et al. | |
| 7,696,690 B2 | 4/2010 | Terashima et al. | |

(Continued)

FOREIGN PATENT DOCUMENTS

| | | |
|---|---|---|
| CN | 101346818 A | 1/2009 |
| CN | 100523980 C | 8/2009 |

(Continued)

*Primary Examiner* — Anh Mai
*Assistant Examiner* — Matthew Peerce
(74) *Attorney, Agent, or Firm* — Birch, Stewart, Kolasch & Birch, LLP

(57) ABSTRACT

An optical member including a wavelength conversion layer to convert a wavelength of an incident light; an upper anti-reflective layer of at least two layers disposed on a first surface of the wavelength conversion layer; and a lower anti-reflective layer of at least two layers disposed under a second surface of the wavelength conversion layer opposite to the first surface. Further, wherein the at least two layers of the lower anti-reflective layer have different refractive indices.

13 Claims, 10 Drawing Sheets

(56) References Cited

U.S. PATENT DOCUMENTS

| | | |
|---|---|---|
| 8,075,148 B2 | 12/2011 | Nada |
| 2004/0183434 A1* | 9/2004 | Yeh .................... H05B 33/10 |
| | | 313/506 |
| 2005/0285526 A1 | 12/2005 | Moon et al. |
| 2006/0268537 A1 | 11/2006 | Kurihara et al. |
| 2008/0028984 A1 | 2/2008 | Meredith et al. |
| 2008/0094691 A1 | 4/2008 | Monch et al. |
| 2008/0176066 A1 | 7/2008 | Chang et al. |
| 2008/0239488 A1* | 10/2008 | Asakura ................ G02B 1/111 |
| | | 359/485.01 |
| 2009/0001399 A1* | 1/2009 | Diana ................. H01L 33/507 |
| | | 257/98 |
| 2010/0283036 A1* | 11/2010 | Coe-Sullivan ....... H05B 33/145 |
| | | 257/13 |

FOREIGN PATENT DOCUMENTS

| | | |
|---|---|---|
| KR | 10-2001-0090638 A | 10/2001 |
| KR | 10-2005-0100602 A | 10/2005 |
| KR | 10-2006-0125535 A | 12/2006 |
| KR | 10-2008-0063986 A | 7/2008 |
| KR | 10-2009-0060149 A | 6/2009 |
| KR | 10-2010-0129030 A | 12/2010 |
| TW | 200831658 A | 8/2008 |
| TW | 200910287 A | 3/2009 |

\* cited by examiner

OPTICAL MEMBER AND DISPLAY DEVICE INCLUDING THE SAME

This application is a continuation of copending U.S. patent application Ser. No. 14/110,387, filed on Oct. 7, 2013, which is a National Stage of PCT/KR2011/009234, filed on Nov. 30, 2011, which claims the benefit under 35 U.S.C. §119(a) to Patent Application No. 10-2011-0031334, filed in The Republic of Korea on Apr. 5, 2011. The contents of all of these applications are hereby incorporated by reference as fully set forth herein in their entirety.

BACKGROUND

The disclosure relates to an optical member and a display device including the same.

Recently, flat display devices, such as an LCD (liquid crystal display), a PDA (plasma display panel) or an OLED (organic light emitting diode), have been increasingly developed instead of conventional CRTs (cathode ray tubes).

Among them, the LCD includes a liquid crystal display panel having a thin film transistor substrate, a color filter substrate and a liquid crystal injected between the thin film transistor substrate and the color filter substrate. Since the liquid crystal display panel is a non-emissive device, a backlight unit is provided below the thin film transistor substrate to supply light. Transmittance of the light emitted from the backlight unit is adjusted according to the alignment state of the liquid crystal.

The backlight unit is classified into an edge-illumination type backlight unit and a direct-illumination type backlight unit according to the position of a light source. According to the edge-illumination type backlight unit, the light source is located at a lateral side of a light guide plate.

The direct-illumination type backlight unit has been developed as the size of the LCD has become enlarged. According to the direct-illumination type backlight unit, at least one light source is located below the liquid crystal display panel to supply the light over the whole area of the liquid crystal display panel.

When comparing with the edge-illumination type backlight unit, the direct-illumination type backlight unit can employ a large number of light sources so that the high brightness can be achieved. In contrast, the direct-illumination type backlight unit must have thickness larger than thickness of the edge-illumination type backlight unit in order to ensure brightness uniformity.

In order to solve the above problem, a quantum dot bar having a plurality of quantum dots, which can convert blue light into red light or green light, is positioned in front of a blue LED that emits the blue light. Thus, as the blue light is irradiated onto the quantum dot bar, the blue light, the red light and the green light are mixed and the mixed light is incident into the light guide plate, thereby generating white light.

If the white light is supplied to the light guide plate by using the quantum dot bar, high color reproduction may be realized.

The backlight unit may include an FPCB (flexible printed circuit board) provided at one side of the blue LED to supply signals and power to the LEDs and a bonding member formed under the bottom surface of the FPCB.

The display device capable of displaying various images using the white light supplied to the light guide plate through the quantum dot bar as the blue light is emitted from the blue LED has been extensively used.

SUMMARY

The embodiment provides an optical member capable of improving brightness and color reproduction and a display device including the same.

An optical member according to the embodiment includes a wavelength conversion layer to convert a wavelength of an incident light; a first anti-reflective layer on a first surface of the wavelength conversion layer; and a second anti-reflective layer under a second surface of the wavelength conversion layer opposite to the first surface.

A display device according to the embodiment includes a light source for generating a light; a wavelength conversion member into which the light generated from the light source is incident; and a display panel into which the light output from the wavelength conversion member is incident, wherein the wavelength conversion member includes a wavelength conversion layer into which the light generated from the light source is incident; a first anti-reflective layer disposed before the wavelength conversion layer in a path of the light output from the light source; and a second anti-reflective layer disposed after the wavelength conversion layer in the path of the light output from the light source.

A display device according to the embodiment includes a light guide plate; a light source at a lateral side of the light guide plate; and a wavelength conversion member between the light guide plate and the light source, wherein the wavelength conversion member includes a wavelength conversion layer to convert a wavelength of a light generated from the light source; a first anti-reflective layer interposed between the wavelength conversion layer and the light source; and a second anti-reflective layer interposed between the wavelength conversion layer and the light guide plate.

The optical member according to the embodiment includes the first and second anti-reflective layers. Thus, the light can be efficiently incident into the optical member in the upward and downward directions. In addition, the optical member according to the embodiment can effectively output the light in the upward and downward directions.

Therefore, the light can be effectively incident into the wavelength conversion layer and the optical member according to the embodiment can effectively convert the wavelength of the light.

In particular, the optical member according to the embodiment can be interposed between other optical sheets or between the optical sheet and the light guide plate. At this time, the light passing through the optical member according to the embodiment is reflected from other optical sheets and then incident again into the optical member according to the embodiment.

Since the optical member according to the embodiment is provided at upper and lower portions thereof with the anti-reflective layers, the light reflected from other optical sheets can be effectively incident into the wavelength conversion layer.

Thus, the optical member according to the embodiment can effectively convert the wavelength of the light emitted from the light source and the display device according to the embodiment may improve the color reproduction and the brightness.

DETAILED DESCRIPTION OF THE EMBODIMENTS

Figure 1:
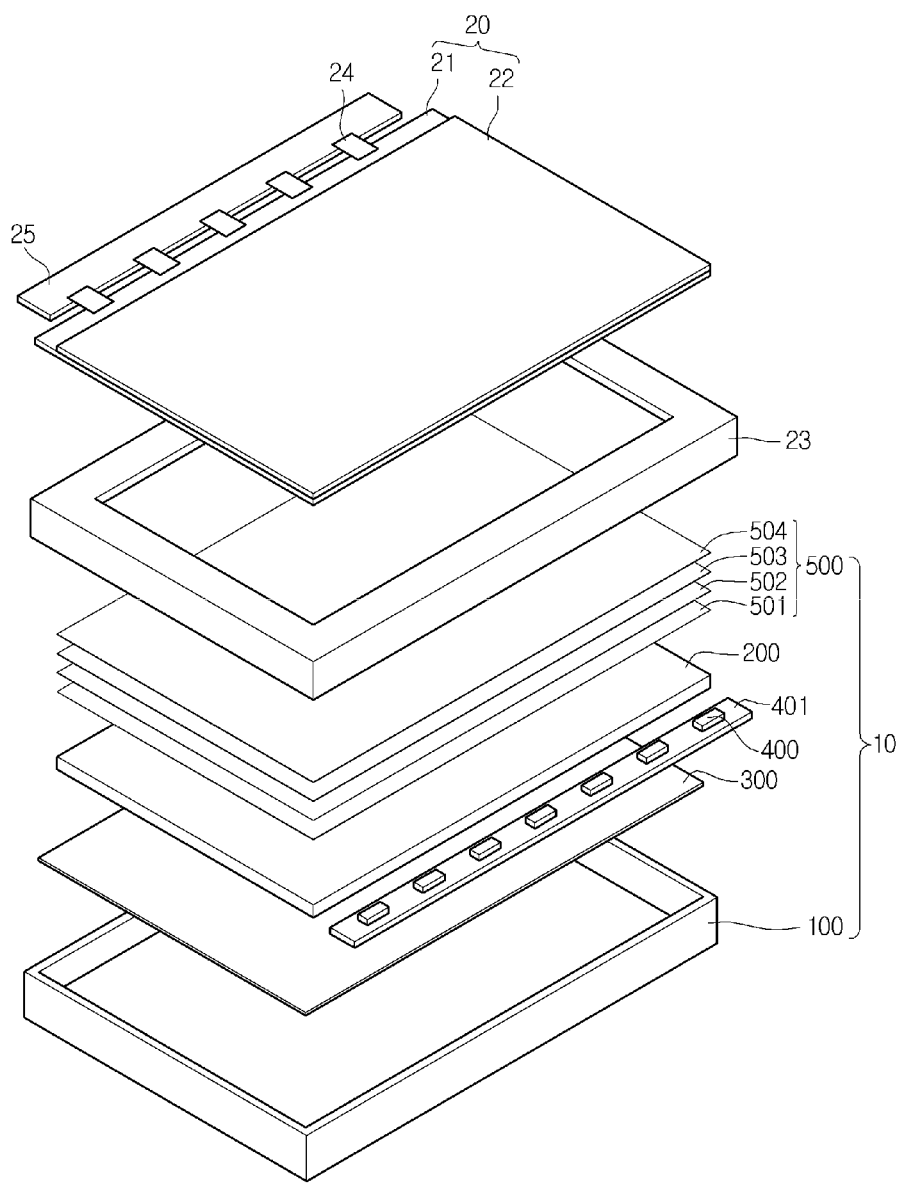
FIG. 1 is an exploded perspective view showing an LCD according to the first embodiment.

In the description of the embodiments, it will be understood that when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings. The thickness and size of each layer shown in the drawings may be exaggerated, omitted or schematically drawn for the purpose of convenience or clarity. In addition, the size of elements does not utterly reflect an actual size.

Figure 2:
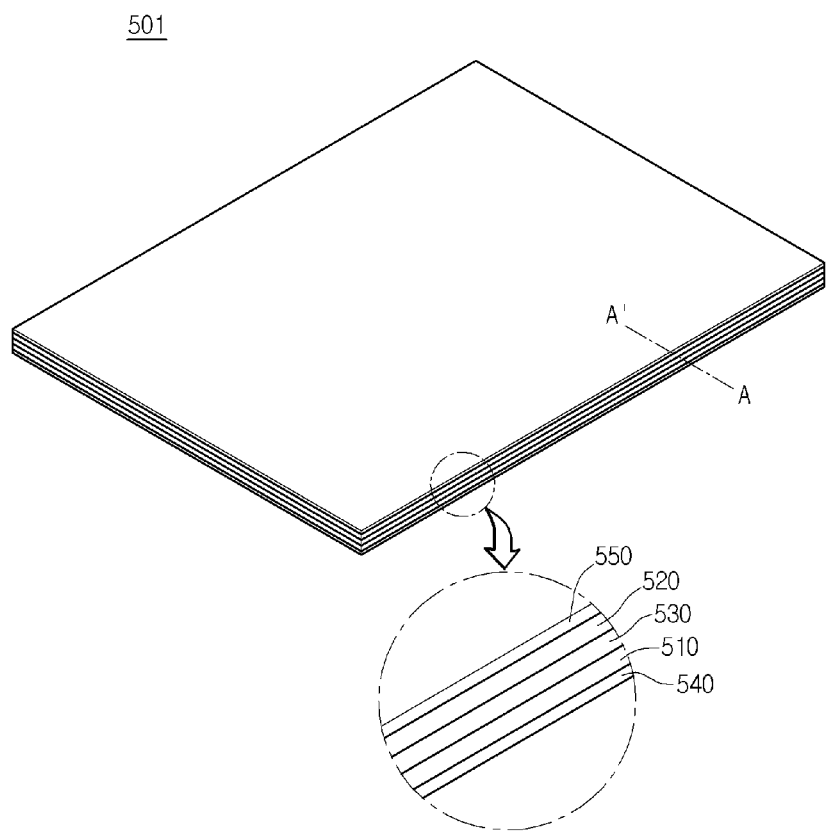
FIG. 2 is a perspective view of a wavelength conversion sheet.
Figure 3:
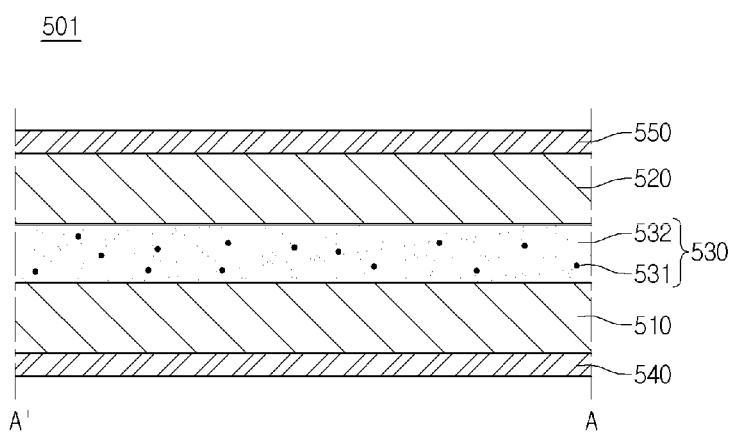
FIG. 3 is a sectional view taken along line A-A' of FIG. 2.
Figure 6:
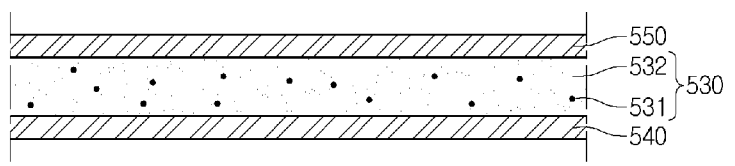
Figure 7:
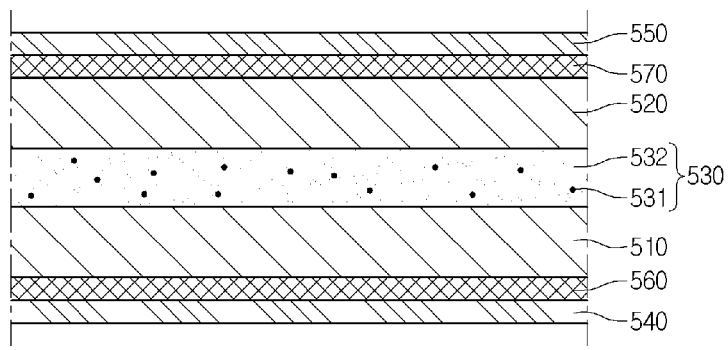
Figure 8:
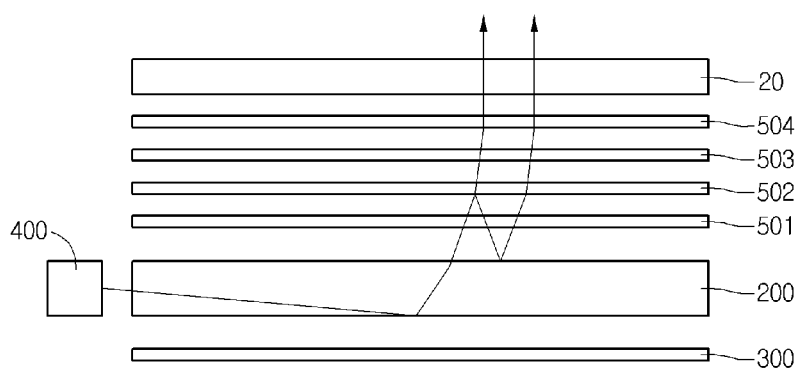
FIG. 8 is a view showing the procedure for converting the wavelength of incident light by using a wavelength conversion sheet.

FIG. 1 is an exploded perspective view showing an LCD according to the first embodiment, FIG. 2 is a perspective view of a wavelength conversion sheet, FIG. 3 is a sectional view taken along line A-A' of FIG. 2, FIGS. 4 to 7 are sectional views showing various modified examples of a wavelength conversion sheet, and FIG. 8 is a view showing the procedure for converting the wavelength of incident light by using a wavelength conversion sheet.

Referring to FIGS. 1 to 8, the LCD according to the embodiment includes a backlight unit 10 and a liquid crystal panel 20.

The backlight unit 10 supplies light to the liquid crystal panel 20. The backlight unit 10 serves as a surface light source so that the light can be uniformly supplied to a bottom surface of the liquid crystal panel 20.

The backlight unit 10 is disposed below the liquid crystal panel 20. The backlight unit 10 includes a bottom cover 100, a light guide plate 200, a reflective sheet 300, a light source, such as a plurality of light emitting diodes 400, a printed circuit board 401, and a plurality of optical sheets 500.

The upper portion of the bottom cover 100 is open. The bottom cover 100 receives the light guide plate 200, the light emitting diodes 400, the printed circuit board 401, the reflective sheet 300, and the optical sheets 500 therein.

The light guide plate 200 is disposed in the bottom cover 100 and arranged on the reflective sheet 300. The light guide plate 200 guides the light upward by totally reflecting, refracting and scattering the light incident thereto from the light emitting diodes 400.

The reflective sheet 300 is disposed under the light guide plate 200. In more detail, the reflective sheet 300 is disposed between the light guide plate 200 and the bottom surface of the bottom cover 100. The reflective sheet 300 reflects the light upward as the light is output downward from the bottom surface of the light guide plate 200.

The light emitting diodes 400 serve as a light source for generating the light. The light emitting diodes 400 are disposed at one lateral side of the light guide plate 200. The light generated from the light emitting diodes 400 is incident into the light guide plate 200 through the lateral side of the light guide plate 200.

The light emitting diodes 400 may include a blue light emitting diode generating the blue light or a UV light emitting diode generating the UV light. In detail, the light emitting diodes 400 can emit the blue light having the wavelength band of about 430 nm to 470 nm or the UV light having the wavelength band of about 300 nm to 400 nm.

The light emitting diodes 400 are mounted on the printed circuit board 401. The light emitting diodes 400 can be disposed under the printed circuit board 401. The light emitting diodes 400 are driven by receiving a driving signal through the printed circuit board 401.

The printed circuit board 401 is electrically connected to the light emitting diodes 400. The printed circuit board 401 can mount the light emitting diodes 400 thereon. The printed circuit board 401 is disposed in the bottom cover 100.

The optical sheets 500 are disposed on the light guide plate 200. The optical sheets 500 supplies the light to the liquid crystal panel 20 by changing or enhancing the optical property of the light output from the top surface of the light guide plate 200.

The optical sheets 500 include a wavelength conversion sheet 501, a diffusion sheet 502, a first prism sheet 503 and a second prism sheet 504.

The wavelength conversion sheet 501 is disposed in the optical path between the light source and the liquid crystal panel. For instance, the wavelength conversion sheet 501 is disposed on the light guide plate 200. In more detail, the wavelength conversion sheet 501 can be interposed between the light guide plate 200 and the diffusion sheet 502. Otherwise, the wavelength conversion sheet 501 can be disposed between the diffusion sheet 502 and the first prism sheet 503. In addition, the wavelength conversion sheet 501 can be disposed between the first prism sheet 503 and the second prism sheet 504. Further, the wavelength conversion sheet 501 can be disposed between the second prism sheet 504 and the liquid crystal panel 20.

The wavelength conversion sheet 501 guides the light upward by changing the wavelength of the incident light. For instance, if the light emitting diodes 400 are blue light emitting diodes, the wavelength conversion sheet 501 converts the blue light output upward from the light guide plate 200 into the green light and the red light. In detail, the wavelength conversion sheet 501 converts a part of the blue light into the green light having the wavelength in the range of about 520 nm to about 560 nm, and a part of the blue light into the red light having the wavelength in the range of about 630 nm to about 660 nm.

In addition, if the light emitting diodes 400 are UV light emitting diodes, the wavelength conversion sheet 501 converts the UV light output from the top surface of the light guide plate 200 into the blue light, the green light and the red light. In detail, the wavelength conversion sheet 501 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion sheet 501 without being converted and the lights converted by the wavelength conversion sheet 501. In detail, the white light can be incident into the liquid crystal panel 20 through the combination of the blue light, the green light and the red right. The wavelength conversion sheet 501 is a wavelength conversion member capable of converting the wavelength of the incident light. That is, the wavelength conversion sheet 501 is an optical member capable of converting or enhancing the characteristic of the incident light.

As shown in FIGS. 2 and 3, the wavelength conversion sheet 501 includes a lower substrate 510, an upper substrate 520, a wavelength conversion layer 530, a lower anti-reflective layer 540, and an upper anti-reflective layer 550.

The lower substrate 510 is disposed under the wavelength conversion layer 530. The lower substrate 510 may be transparent and flexible. The lower substrate 510 adheres to the bottom surface of the wavelength conversion layer 530.

The lower substrate 510 may include transparent polymer, such as polyethyleneterephthalate (PET).

The upper substrate 520 is disposed on the wavelength conversion layer 530. The upper substrate 520 may be transparent and flexible. The upper substrate 520 adheres to the top surface of the wavelength conversion layer 530.

The upper substrate 520 may include transparent polymer, such as polyethyleneterephthalate (PET).

The wavelength conversion layer 530 is sandwiched between the upper and lower substrates 520 and 510. The upper and lower substrates 520 and 510 support the wavelength conversion layer 530. The upper and lower substrates 520 and 510 protect the wavelength conversion layer 530 from external physical impact.

In addition, the upper and lower substrates 520 and 510 have low oxygen and moisture permeability. Thus, the upper and lower substrates 520 and 510 can protect the wavelength conversion layer 530 from external chemical penetration, such as oxygen and/or moisture.

The wavelength conversion layer 530 is interposed between the upper and lower substrates 520 and 510. The wavelength conversion layer 530 adheres to the top surface of the lower substrate 510 and the bottom surface of the upper substrate 520.

The wavelength conversion layer 530 includes a plurality of wavelength conversion particles 531 and a matrix 532.

The wavelength conversion particles 531 are disposed between the upper and lower substrates 520 and 510. In more detail, the wavelength conversion particles 531 are uniformly distributed in the matrix 532 disposed between the upper and lower substrates 520 and 510.

The wavelength conversion particles 531 convert the wavelength of the light emitted from the light emitting diodes 400. In detail, the light is incident into the wavelength conversion particles 531 from the light emitting diodes 400 and the wavelength conversion particles 531 convert the wavelength of the incident light. For instance, the wavelength conversion particles 531 can convert the blue light emitted from the light emitting diodes 400 into the green light and the red light. That is, a part of the wavelength conversion particles 531 converts the blue light into the green light having the wavelength in the range of about 520 nm to about 560 nm and a part of the wavelength conversion particles 531 converts the blue light into the red light having the wavelength in the range of about 630 nm to about 660 nm.

In addition, the wavelength conversion particles 531 can convert the UV light emitted from the light emitting diodes 400 into the blue light, the green light and the red light. That is, a part of the wavelength conversion particles 531 converts the UV light into the blue light having the wavelength in the range of about 430 nm to about 470 nm, and a part of the wavelength conversion particles 531 converts the UV light into the green light having the wavelength in the range of about 520 nm to about 560 nm. Further, a part of the wavelength conversion particles 531 converts the UV light into the red light having the wavelength in the range of about 630 nm to about 660 nm.

In other words, if the light emitting diodes 400 are blue light emitting diodes that emit the blue light, the wavelength conversion particles 531 capable of converting the blue light into the green light and the red light may be employed. In addition, if the light emitting diodes 400 are UV light emitting diodes that emit the UV light, the wavelength conversion particles 531 capable of converting the UV light into the blue light, the green light and the red light may be employed.

The wavelength conversion particles 531 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals can be prepared as at least two layers. The shell nano-crystals are formed on the surface of the core nano-crystals. The quantum dots lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot or the molar ratio between the molecular cluster compound and the nano-particle precursor in the synthesis process. The organic ligand may include pyridine, mercapto alcohol, thiol, phosphine and phosphine oxide. The organic ligand may stabilize the unstable quantum dots after the synthesis process. Dangling bonds may be formed at the valence band and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient higher than that of the general fluorescent pigment by 100 to 1000 times and has the superior quantum yield, so that strong fluorescent light can be generated.

The quantum dots can be synthesized through the chemical wet scheme. According to the chemical wet scheme, the particles are grown by immersing the precursor material in the organic solvent.

The matrix 532 surrounds the wavelength conversion particles 531. In detail, the wavelength conversion particles 531 are uniformly distributed in the matrix 352. The matrix 532 includes polymer. The matrix 532 is transparent. That is, the matrix 532 includes transparent polymer. For instance, the matrix 532 may include silicon resin.

The matrix 532 is interposed between the lower substrate 510 and the upper substrate 520. In detail, the matrix 532 adheres to the top surface of the lower substrate 510 and the bottom surface of the upper substrate 520.

The lower anti-reflective layer 540 is disposed below the wavelength conversion layer 530. In detail, the lower anti-reflective layer 540 is disposed on a bottom surface of the wavelength conversion layer 530. In more detail, the lower anti-reflective layer 540 is disposed under the lower substrate 510. In more detail, the lower anti-reflective layer 540 is coated on the bottom surface of the lower substrate 510.

The lower anti-reflective layer 540 has the refractive index lower than that of the lower substrate 510. For instance, the lower anti-reflective layer 540 has the refractive index in the range of 1.3 to 1.6.

Therefore, the lower anti-reflective layer 540 performs the optical damping function between the lower substrate 510 and an air layer, so that the light reflection is reduced at the bottom surface of the lower substrate 510.

For instance, the lower anti-reflective layer 540 may include $SiO_2$, $NaBF_4$, $KMgF_3$, $MgF_2$, LiF, $CaF_2$ or $AlF_3$.

The lower anti-reflective layer 540 may have thickness in a range of about 90 nm to about 110 nm.

The upper anti-reflective layer 550 is disposed on the wavelength conversion layer 530. In detail, the upper anti-reflective layer 550 is disposed on a top surface of the wavelength conversion layer 530. In more detail, the upper anti-reflective layer 550 is disposed on the upper substrate 520. In more detail, the upper anti-reflective layer 550 is coated on the top surface of the upper substrate 520.

The upper anti-reflective layer 550 has the refractive index lower than that of the upper substrate 520. For instance, the upper anti-reflective layer 550 has the refractive index in the range of 1.3 to 1.6.

Therefore, the upper anti-reflective layer 550 performs the optical damping function between the upper substrate 520 and the air layer, so that the light reflection can be reduced at the top surface of the upper substrate 520.

For instance, the upper anti-reflective layer 550 may include $SiO_2$, $NaBF_4$, $KMgF_3$, $MgF_2$, LiF, $CaF_2$ or $AlF_3$.

The upper anti-reflective layer 550 may have thickness in a range of about 90 nm to about 110 nm.

The upper and lower anti-reflective layers 540 and 550 may perform the optical function, such as the anti-reflection function, and seal the wavelength conversion layer 530 to protect the wavelength conversion layer 530 from external physical and chemical impact.

In particular, the upper and lower anti-reflective layers 540 and 550 are coated on the lower and upper substrates 510 and 520, respectively. At this time, the upper and lower anti-reflective layers 540 and 550 may include inorganic substance and the lower and upper substrates 510 and 520 may include organic substance. Thus, the wavelength conversion layer 530 is protected by an organic-inorganic composite layer.

Figure 4:
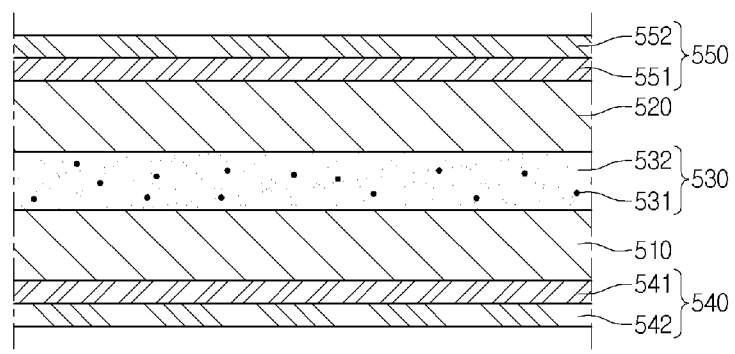
FIGS. 4 to 7 are sectional views showing various modified examples of a wavelength conversion sheet shown in FIG. 7.

In addition, as shown in FIG. 4, the upper and lower anti-reflective layers 540 and 550 can be prepared as two layers, respectively.

The lower anti-reflective layer 540 includes a first lower anti-reflective layer 541 and a second lower anti-reflective layer 542.

The first lower anti-reflective layer 541 is disposed under the lower substrate 510. In detail, the first lower anti-reflective layer 541 is directly coated on the bottom surface of the lower substrate 510.

The second lower anti-reflective layer 542 is disposed under the first lower anti-reflective layer 541. In detail, the second lower anti-reflective layer 542 is directly coated on the bottom surface of the first lower anti-reflective layer 541.

The second lower anti-reflective layer 542 may have a refractive index lower than that of the first lower anti-reflective layer 541. In addition, the first lower anti-reflective layer 541 may have a refractive index lower than that of the lower substrate 510.

In other words, the refractive index is increased in the sequence of the air layer, the second lower anti-reflective layer 542, the first lower anti-reflective layer 541 and the lower substrate 510. For instance, the first lower anti-reflective layer 541 may have the refractive index in the range of about 1.6 to about 2.2 and the second lower anti-reflective layer 542 may have the refractive index in the range of about 1.3 to about 1.6. The first lower anti-reflective layer 541 may include $TiO_2$, $Al_2O_3$, $MgSiO_3$ or MgO. In addition, the second lower anti-reflective layer 542 may include $SiO_2$, $NaBF_4$, $KMgF_3$, $MgF_2$, LiF, $CaF_2$ or $AlF_3$.

The upper anti-reflective layer 550 includes a first upper anti-reflective layer 551 and a second upper anti-reflective layer 552.

The first upper anti-reflective layer 551 is disposed on the upper substrate 520. In detail, the first upper anti-reflective layer 551 is directly coated on the top surface of the upper substrate 520.

The second upper anti-reflective layer 552 is disposed on the first upper anti-reflective layer 551. In detail, the second upper anti-reflective layer 552 is directly coated on the top surface of the first upper anti-reflective layer 551.

The second upper anti-reflective layer 552 may have a refractive index lower than that of the first upper anti-reflective layer 551. In addition, the first upper anti-reflective layer 551 may have a refractive index lower than that of the upper substrate 520.

In other words, the refractive index is increased in the sequence of the air layer, the second upper anti-reflective layer 552, the first upper anti-reflective layer 551 and the upper substrate 520. For instance, the first upper anti-reflective layer 551 may have the refractive index in the range of about 1.6 to about 2.2 and the second upper anti-reflective layer 552 may have the refractive index in the range of about 1.3 to about 1.6.

The first upper anti-reflective layer 551 may include $TiO_2$, $Al_2O_3$, $MgSiO_3$ or $MgO$. In addition, the second upper anti-reflective layer 552 may include $SiO_2$, $NaBF_4$, $KMgF_3$, $MgF_2$, $LiF$, $CaF_2$ or $AlF_3$.

Figure 5:
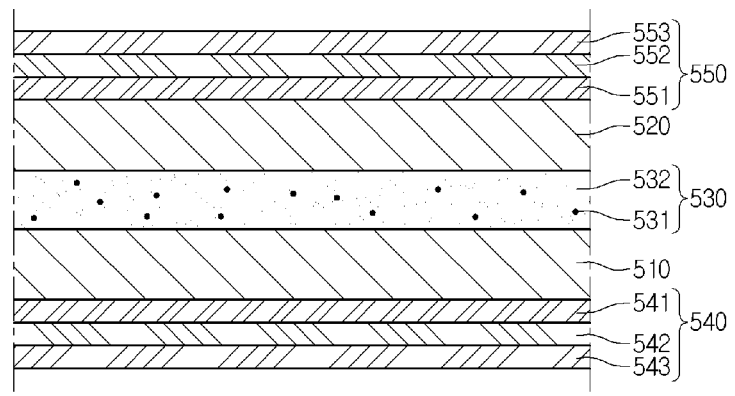

In addition, as shown in FIG. 5, the lower anti-reflective layer 540 and the upper anti-reflective layer 550 can be prepared as at least three layers, respectively.

In detail, the lower anti-reflective layer 540 may include at least three layers 541, 542 and 543. In this case, the refractive index of the three layers 541, 542 and 543 is gradually lowered in the downward direction. Otherwise, the lower anti-reflective layer 540 may be prepared as a stack structure by alternately stacking layers having the high refractive index and low refractive index.

The upper anti-reflective layer 550 may include at least three layers 551, 552 and 553. In this case, the refractive index of the three layers 551, 552 and 553 is gradually lowered in the upward direction. Otherwise, the upper anti-reflective layer 550 may be prepared as a stack structure by alternately stacking layers having the high refractive index and low refractive index.

In addition, as shown in FIG. 6, the lower substrate 510 and the upper substrate 520 can be omitted. In this case, the lower anti-reflective layer 540 is directly coated on the bottom surface of the wavelength conversion layer 530. In addition, the upper anti-reflective layer 550 is directly coated on the top surface of the wavelength conversion layer 530.

The matrix 532 of the wavelength conversion layer 530 may include organic substance, such as silicon resin and the lower and upper anti-reflective layers 540 and 550 may include inorganic substance.

Therefore, the wavelength conversion particles 531 of the wavelength conversion layer 530 can be protected from external moisture and/or oxygen by the organic-inorganic composite structure. Thus, the wavelength conversion sheet 501 may have the improved reliability and durability.

In addition, as shown in FIG. 7, a first inorganic protective layer 560 can be interposed between the lower substrate 510 and the lower anti-reflective layer 540. In this case, the refractive index of the lower anti-reflective layer 540 may be lower than that of the first inorganic protective layer 560. The first inorganic protective layer 560 may include silicon oxide.

Further, a second inorganic protective layer 570 can be interposed between the upper substrate 520 and the upper anti-reflective layer 550. In this case, the refractive index of the upper anti-reflective layer 550 may be lower than that of the second inorganic protective layer 570. The second inorganic protective layer 570 may include silicon oxide.

The diffusion sheet 502 is disposed on the wavelength conversion sheet 501 to improve uniformity of light passing through the diffusion sheet 502. The diffusion sheet 502 may include a plurality of beads.

The first prism sheet 503 is disposed on the diffusion sheet 502. The second prism sheet 504 is formed on the first prism sheet 503. The first and second prism sheets 503 and 504 may enhance the linearity of light passing through the first and second prism sheets 503 and 504.

The liquid crystal panel 20 is disposed on the optical sheets 500. In addition, the liquid crystal panel 20 is disposed on the panel guide 23. The liquid crystal panel 20 is guided by the panel guide 23.

The liquid crystal panel 20 displays images by adjusting intensity of light passing through the liquid crystal panel 20. In detail, the liquid crystal panel 20 is a display panel for displaying the images by using the light emitted from the backlight unit 10. The liquid crystal panel 20 includes a TFT substrate 21, a color filter substrate 22 and a liquid crystal layer interposed between the two substrates. In addition, the liquid crystal panel 20 includes polarizing filters.

Although it is not shown in the drawings in detail, the TFT substrate 21 includes a plurality of gate lines crossing a plurality of data lines to form pixels and a thin film transistor (TFT) is provided at each cross section such that the thin film transistor can be connected to a pixel electrode of the pixel in one-to-one correspondence. The color filter substrate 22 includes color filters having R, G and B colors corresponding to the pixels, a black matrix covering the gate lines, data lines and thin film transistors within the limit of the color filters, and a common electrode covering the above elements.

A driving PCB 25 is provided at an outer peripheral portion of the LCD panel 210 to supply driving signals to the gate lines and data lines.

The driving PCB 25 is electrically connected to the liquid crystal panel 20 by a COF (chip on film) 24. The COF 24 may be replaced with a TCP (tape carrier package).

Since the wavelength conversion sheet 501 includes the lower anti-reflective layer 540, the light output from the light guide plate 200 can be effectively incident into the wavelength conversion sheet 501. In addition, due to the upper anti-reflective layer 550, the light output from the wavelength conversion layer 530 can be effectively guided in the upward direction.

In addition, as shown in FIG. 8, the light that passes through the wavelength conversion layer 530 without being converted may be reflected downward by the optical sheets 502, 503 and 504. The light reflected downward can be effectively incident into the wavelength conversion layer 530 due to the upper anti-reflective layer 550.

In this manner, a greater amount of light is incident into the wavelength conversion layer 530, so that the conversion efficiency of the wavelength conversion layer 530 can be improved.

Thus, the wavelength conversion sheet 501 can effectively convert the wavelength of the light emitted from the light emitting diodes 400 and the LCD according to the embodiment can improve the color reproduction and the brightness.

Figure 9:
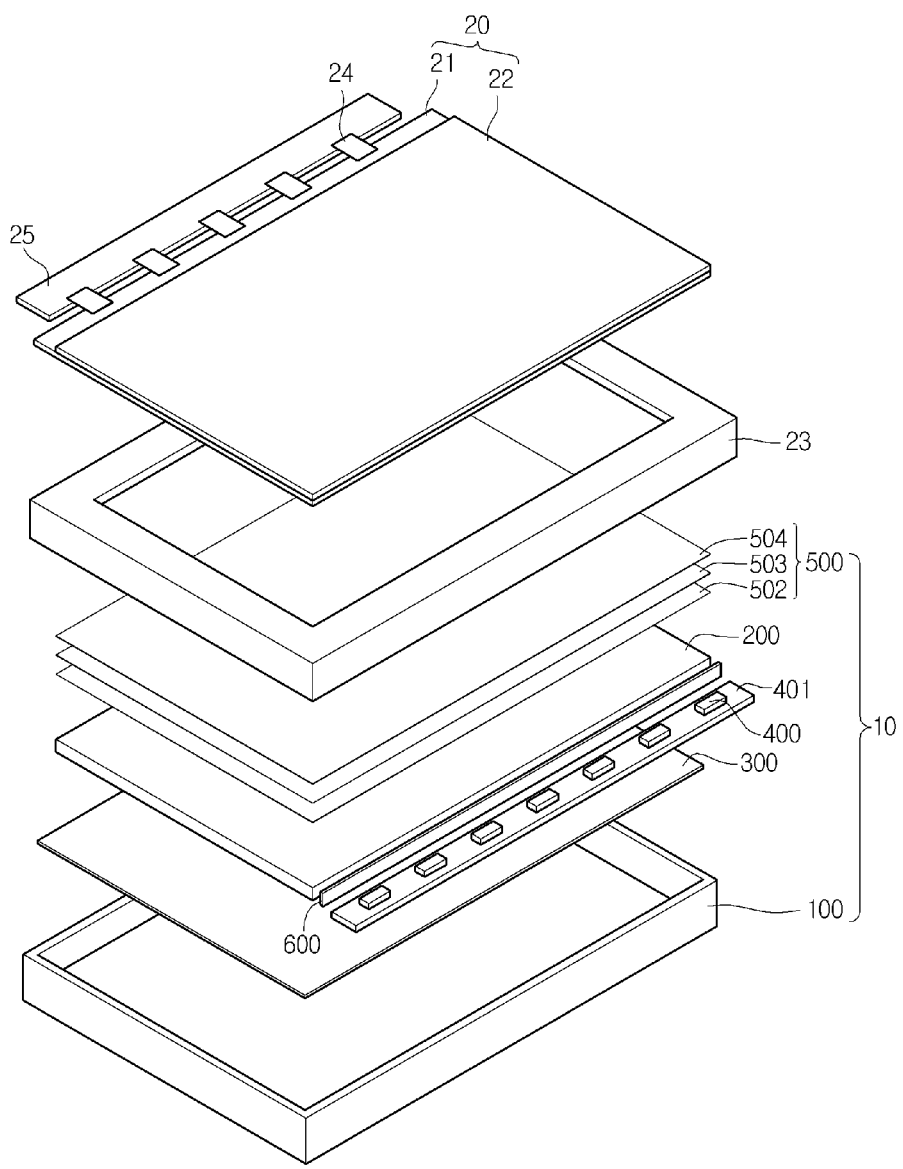
FIG. 9 is an exploded perspective view showing an LCD according to the second embodiment.
Figure 10:
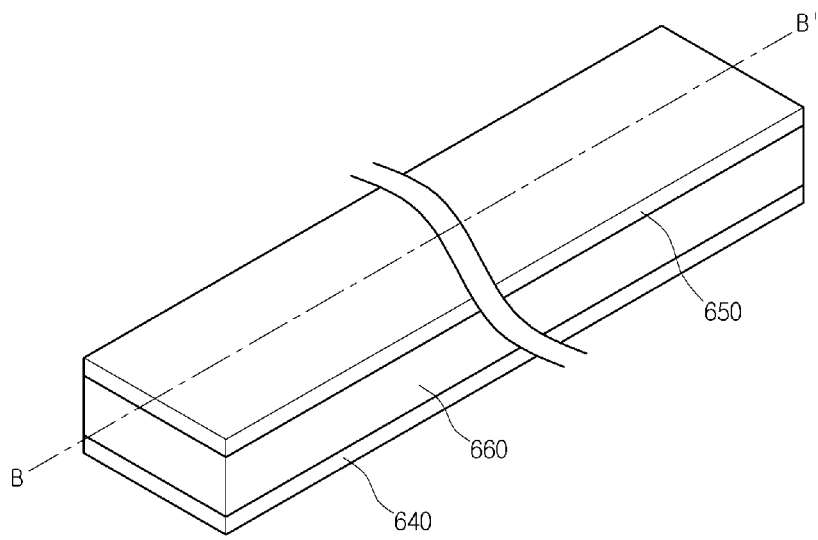
FIG. 10 is a perspective view of a wavelength conversion member according to the second embodiment.
Figure 11:
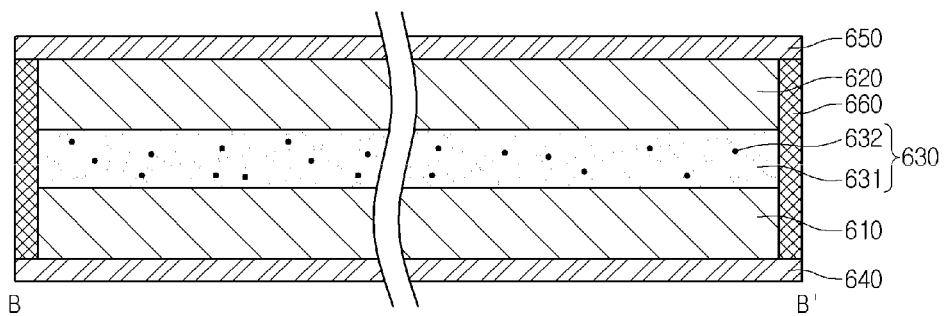
FIG. 11 is a sectional view taken along line B-B' of FIG. 10.
Figure 12:
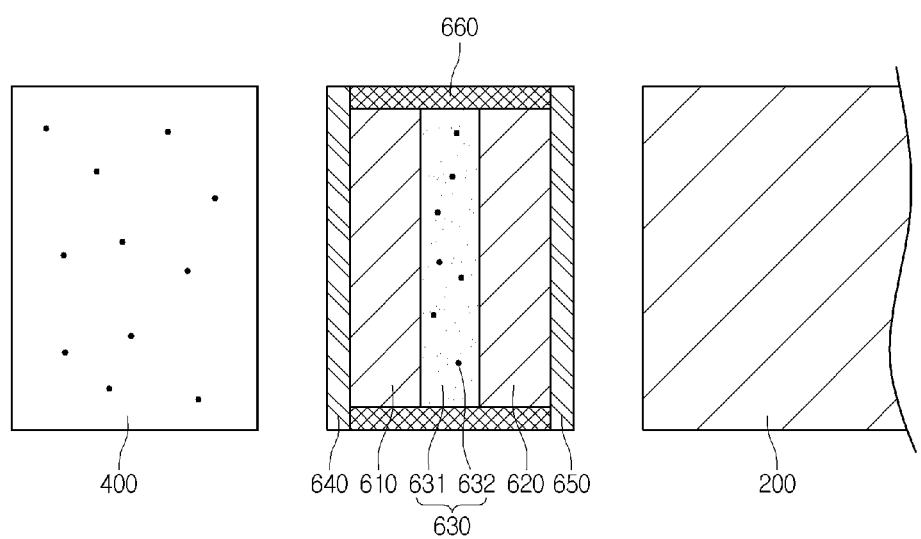
FIG. 12 is a sectional view showing a light guide plate, a light emitting diode, and a wavelength conversion member.

FIG. 9 is an exploded perspective view showing an LCD according to the second embodiment, FIG. 10 is a perspective view of a wavelength conversion member according to the second embodiment, FIG. 11 is a sectional view taken along line B-B' of FIG. 10, and FIG. 12 is a sectional view showing a light guide plate, a light emitting diode, and a wavelength conversion member. The description of the previous embodiment will be incorporated in the description of the present embodiment by reference. That is, the description about the LCD according to the previous embodiment will be incorporated in the description about the LCD according to the present embodiment.

Referring to FIGS. 9 to 12, the LCD according to the present embodiment includes a wavelength conversion member 600 instead of the wavelength conversion sheet. The wavelength conversion member 600 is interposed between the light emitting diodes 400 and the light guide plate 200.

The wavelength conversion member 600 extends in one direction. In detail, the wavelength conversion member 600 extends along one lateral side of the light guide plate 200. In more detail, the wavelength conversion member 600 may have a shape extending along an incident surface of the light guide plate 200.

The wavelength conversion member 600 receives the light emitted from the light emitting diodes 400 to convert the wavelength of the light. For instance, the wavelength conversion member 600 converts the blue light emitted from the light emitting diodes 400 into the green light and the red light. In detail, the wavelength conversion member 600 converts a part of the blue light into the green light having the wavelength in the range of about 520 nm to about 560 nm, and a part of the blue light into the red light having the wavelength in the range of about 630 nm to about 660 nm.

In addition, the wavelength conversion member 600 can convert the UV light emitted from the light emitting diodes 400 into the blue light, the green light and the red light. In detail, the wavelength conversion member 600 converts a part of the UV light into the blue light having the wavelength in the range of about 430 nm to about 470 nm, a part of the UV light into the green light having the wavelength in the range of about 520 nm to about 560 nm, and a part of the UV light into the red light having the wavelength in the range of about 630 nm to about 660 nm.

Therefore, the white light may be generated by the light passing through the wavelength conversion member 600 and the lights converted by the wavelength conversion member 600. In detail, the white light can be incident into the light guide plate 200 through the combination of the blue light, the green light and the red right. That is, the wavelength conversion member 600 is an optical member capable of converting or enhancing the characteristic of the light.

As shown in FIGS. 10 to 12, the wavelength conversion member 600 includes a lower substrate 610, an upper substrate 620, a wavelength conversion layer 630, a lateral side protective layer 660, a lower anti-reflective layer 640 and an upper anti-reflective layer 650.

As shown in FIG. 11, the lower substrate 610 is disposed under the wavelength conversion layer 630. The lower substrate 610 is transparent and flexible. The lower substrate 610 closely adheres to the bottom surface of the wavelength conversion layer 630.

In addition, as shown in FIG. 12, the lower substrate 610 is opposite to the light emitting diodes 400. In detail, the lower substrate 610 is disposed between the light emitting diodes 400 and the wavelength conversion layer 630.

As shown in FIG. 11, the upper substrate 620 is disposed on the wavelength conversion layer 630. The upper substrate 620 is transparent and flexible. The upper substrate 620 closely adheres to the top surface of the wavelength conversion layer 630.

The lateral side protective layer 660 is disposed at lateral sides of the wavelength conversion layer 630. In detail, the lateral side protective layer 660 covers the lateral sides of the wavelength conversion layer 630. In more detail, the lateral side protective layer 660 may cover the lateral sides of the wavelength conversion layer 630, the lower substrate 610 and the upper substrate 620.

The lateral side protective layer 660 may directly make contact with the lateral sides of the wavelength conversion layer 630.

The lateral side protective layer 660 may include inorganic substance, such as silicon oxide, silicon nitride or aluminum oxide, or organic substance, such as parylene resin.

The wavelength conversion layer 630 is sandwiched between the lower substrate 610 and the upper substrate 620. In addition, the lateral side protective layer 660 covers the lateral sides of the wavelength conversion layer 630. The lower substrate 610 and the upper substrate 620 support the wavelength conversion layer 630. In addition, the lower substrate 610, the upper substrate 620 and the lateral side protective layer 660 protect the wavelength conversion layer 630 from external physical and chemical impact.

As shown in FIG. 11, the lower anti-reflective layer 640 is disposed under the wavelength conversion layer 630. In detail, the lower anti-reflective layer 640 is disposed under the lower substrate 610. In more detail, the lower anti-reflective layer 640 is coated on the bottom surface of the lower substrate 610.

In addition, as shown in FIG. 12, the lower anti-reflective layer 640 is opposite to the light emitting diodes 400. In detail, the lower anti-reflective layer 640 is disposed between the light emitting diodes 400 and the wavelength conversion layer 630. In more detail, the lower anti-reflective layer 640 is disposed between the light emitting diodes 400 and the lower substrate 610.

The lower anti-reflective layer 640 may have the refractive index lower than that of the lower substrate 610. For instance, the lower anti-reflective layer 640 may have the refractive index in the range of 1.3 to 1.6.

Thus, the lower anti-reflective layer 640 may perform the optical damping function between the lower substrate 610 and the air layer, so that the light reflection can be reduced at the bottom surface of the lower substrate 610.

As shown in FIG. 11, the upper anti-reflective layer 650 is disposed on the wavelength conversion layer 630. In detail, the upper anti-reflective layer 650 is disposed on the upper substrate 620. In more detail, the upper anti-reflective layer 650 is coated on the top surface of the upper substrate 620.

In addition, as shown in FIG. 12, the upper anti-reflective layer 650 is opposite to the light guide plate 200. In detail, the upper anti-reflective layer 650 is disposed between the light guide plate 200 and the wavelength conversion layer 630. In more detail, the upper anti-reflective layer 650 is disposed between the light guide plate 200 and the upper substrate 620.

The upper anti-reflective layer 650 may have the refractive index lower than that of the upper substrate 620. For instance, the upper anti-reflective layer 650 may have the refractive index in the range of 1.3 to 1.6.

Thus, the upper anti-reflective layer 650 may perform the optical damping function between the upper substrate 620 and the air layer, so that the light reflection can be reduced at the top surface of the upper substrate 620.

The layer structure of the wavelength conversion member 600 can be variously modified as shown in FIGS. 4 to 7.

In the LCD according to the present embodiment, the wavelength conversion layer 630 has a relatively small size. Thus, a smaller amount of wavelength conversion particles 631 can be used when manufacturing the LCD according to the present embodiment.

Therefore, the LCD according to the present embodiment can reduce the usage of the wavelength conversion particles 631 and can be manufactured at the low cost.

Figure 13:
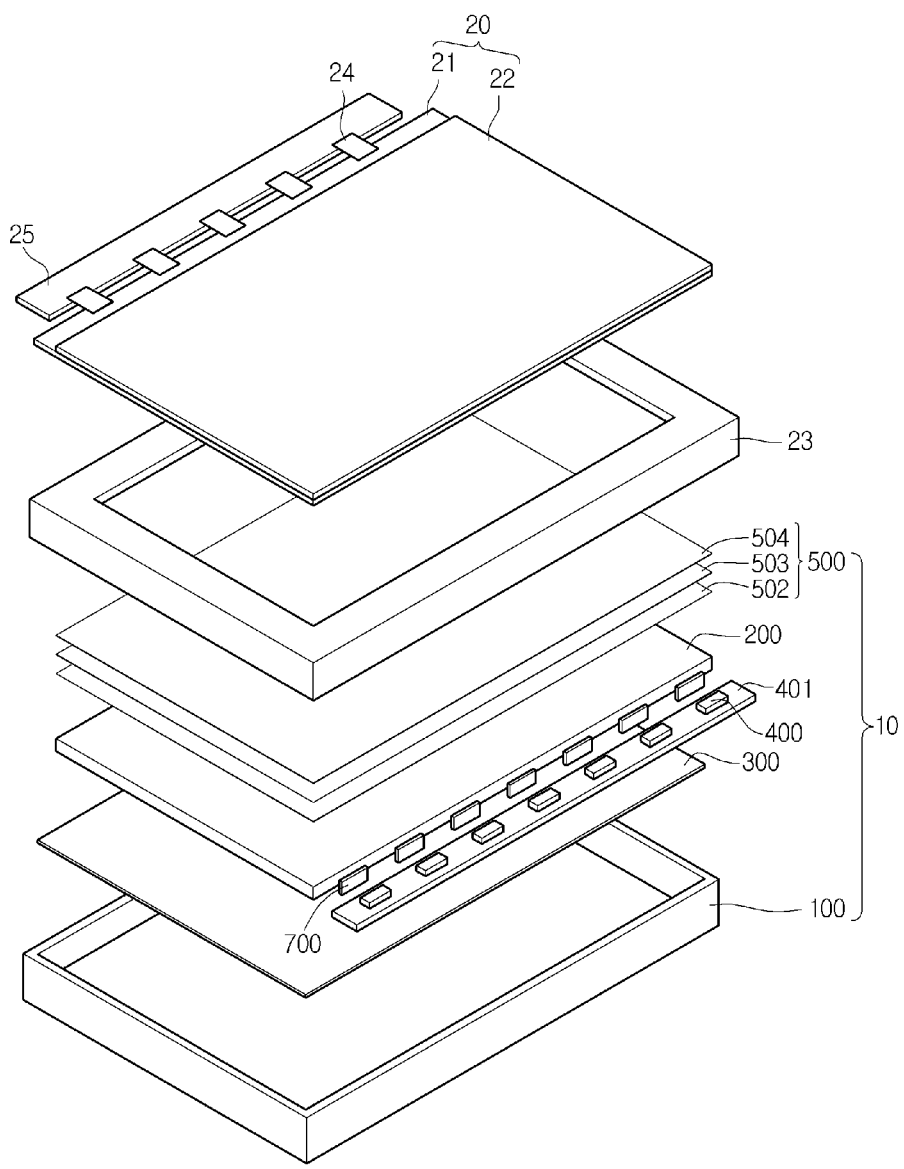
FIG. 13 is an exploded perspective view showing an LCD according to the third embodiment.
Figure 14:
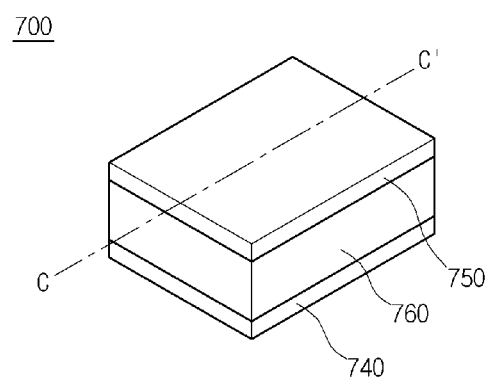
FIG. 14 is a perspective view of a wavelength conversion member according to the third embodiment.
Figure 15:
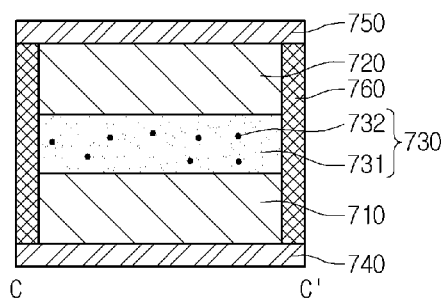
FIG. 15 is a sectional view taken along line C-C' of FIG. 14.
Figure 16:
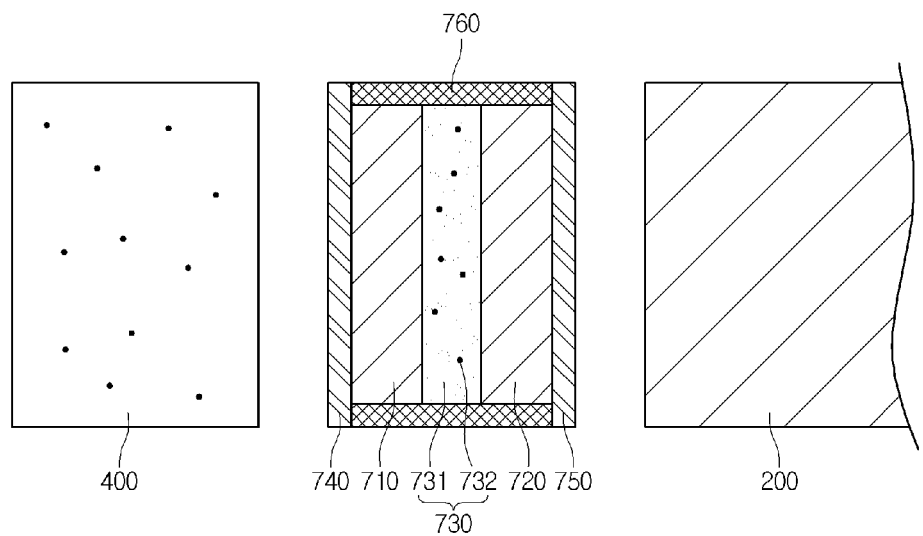
FIG. 16 is a sectional view showing a light guide plate, a light emitting diode, and a wavelength conversion member.

FIG. 13 is an exploded perspective view showing an LCD according to the third embodiment, FIG. 14 is a perspective view of a wavelength conversion member according to the third embodiment, FIG. 15 is a sectional view taken along line C-C' of FIG. 14, and FIG. 16 is a sectional view showing a light guide plate, a light emitting diode, and a wavelength conversion member. The description of the previous embodiment will be incorporated in the description of the present embodiment by reference. That is, the description about the LCD according to the previous embodiment will be incorporated in the description about the LCD according to the present embodiment.

Referring to FIGS. 13 to 16, the LCD according to the present embodiment includes a plurality of wavelength conversion members 700. The wavelength conversion members 700 correspond to the light emitting diodes 400, respectively.

In addition, the wavelength conversion members 700 are disposed between the light emitting diodes 400 and the light guide plate 200. In detail, each wavelength conversion member 700 is disposed between the corresponding light emitting diode 400 and the light guide plate 200.

The wavelength conversion members 700 convert the wavelength of the light emitted from the corresponding light emitting diode 400. The wavelength conversion members 700 are divided into first wavelength conversion members for converting the light emitted from the light emitting diodes 400 into the light having a first wavelength, such as the green light, and second wavelength conversion members for converting the light into the light having a second wavelength, such as the red light.

The wavelength conversion members 700 have a surface area larger than a surface area of the light emitting diodes 400. Thus, most of the light emitted from the light emitting diodes 400 can be incident into the corresponding wavelength conversion member 700.

In addition, as shown in FIGS. 14 to 16, the wavelength conversion member 700 includes a lower substrate 710, an upper substrate 720, a wavelength conversion layer 730, a lateral side protective layer 760, a lower anti-reflective layer 740 and an upper anti-reflective layer 750.

The features of the lower substrate 710, the upper substrate 720, the wavelength conversion layer 730, the lateral side protective layer 760, the lower anti-reflective layer 740 and the upper anti-reflective layer 750 are substantially identical to the features described in the previous embodiments.

In the LCD according to the present embodiment, the wavelength conversion layer 730 has a relatively small size. Thus, a smaller amount of wavelength conversion particles 731 can be used when manufacturing the LCD according to the present embodiment.

Therefore, the LCD according to the present embodiment can reduce the usage of the wavelength conversion particles 731 and can be manufactured at the low cost.

In addition, the features of each wavelength conversion member 700 can be modified suitably for the corresponding light emitting diode. Thus, the LCD according to the embodiments may have the improved brightness and uniform color reproduction characteristic.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effects such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

EXPERIMENTAL EXAMPLE #1

A silicon resin composition including a quantum dot available from Nanosys Inc. was coated on a first PET film and then cured to form a wavelength conversion layer. After that, a second PET film was bonded to the wavelength conversion layer. Then, $Al_2SiO_5$ having the refractive index of 1.66 was deposited on a bottom surface of the first PET film and a top surface of the second PET film. After that, $KMgF_3$ having the refractive index of 1.4 was deposited on and under the $Al_2SiO_5$ layer, so that a wavelength conversion sheet #1 formed on top and bottom surfaces thereof with anti-reflective layers was formed. Then, the wavelength conversion sheet #1 was employed in a backlight unit. In detail, a light guide plate was disposed on a reflective sheet, a blue light emitting diode was disposed at a lateral side of the light guide plate and the wavelength conversion sheet #1, a diffusion sheet, a first prism sheet and a second prism sheet were disposed on the light guide plate.

EXPERIMENTAL EXAMPLE #2

Under the same condition of Experimental Example #1, the anti-reflective layer was formed only on a top surface of the second PET film to form a wavelength conversion sheet #2. Then, the wavelength conversion sheet #2 was employed in the backlight unit used in Experimental Example #1.

COMPARATIVE EXAMPLE

Under the same condition of Experimental Example #1, a wavelength conversion sheet #3 having no anti-reflective layer was formed. Then, the wavelength conversion sheet #3 was employed in the backlight unit used in Experimental Example #1.

Result

The brightness of the backlight unit used in Experimental Examples #1, #2 and #3 was measured. As a result, the backlight unit of Experimental Example #1 represented the brightness of 92.8, the backlight unit of Experimental Example #2 represented the brightness of 91.8, and the backlight unit of Experimental Example #3 represented the brightness of 90.7 with respect to the light having the wavelength in the range of 400 nm to 700 nm. That is, the backlight unit of Experimental Example #1 has the highest brightness.

The display device according to the embodiments can be used in the display field.

What is claimed is:
1. A display device comprising:
a light source for generating a light;
an optical member into which the light generated from the light source is incident;
a light guide plate under the optical member;
a display panel into which the light output from the optical member is incident,
wherein the optical member comprises:
a wavelength conversion layer to convert a wavelength of the light;

an upper substrate and a lower substrate including polyethyleneterephthalate (PET), wherein the wavelength conversion layer is sandwiched between the upper and lower substrates;
an upper anti-reflective layer of at least two layers disposed above a first surface of the wavelength conversion layer; and
a lower anti-reflective layer of at least two layers disposed under a second surface of the wavelength conversion layer opposite to the first surface,
wherein the at least two layers of the lower anti-reflective layer have different refractive indices,
wherein the at least two layers of the upper anti-reflective layer have different refractive indices,
wherein the wavelength conversion layer includes a matrix and a plurality of wavelength conversion particles distributed in the matrix,
wherein the plurality of wavelength conversion particles comprise a quantum dot, and
wherein the optical member is sandwiched between the display panel and the light guide plate.

2. The display device of claim 1, further comprising an optical sheet between the optical member and the display panel.

3. The display device of claim 1, wherein at least one of the upper and lower anti-reflective layers has a refractive index lower than a refractive index of the matrix.

4. The display device of claim 1, wherein the upper anti-reflective layer is coated on the upper substrate, and
wherein the lower anti-reflective layer is coated on the lower substrate.

5. The display device of claim 1, wherein a refractive index of at least one of the at least two layers of the upper anti-reflective layer is lower than a refractive index of the upper substrate, and
wherein a refractive index of at least one of the at least two layers of the lower anti-reflective layer is lower than a refractive index of the lower substrate.

6. The display device of claim 1, further comprising a first inorganic protective layer under the lower substrate and a second inorganic protective layer above the upper substrate.

7. The display device of claim 6, wherein at least one of a refractive index of at least one of the at least two layers of the lower anti-reflective layer is lower than a refractive index of the first inorganic protective layer and at least one of a refractive index of at least one of the at least two layers of the upper anti-reflective layer is lower than a refractive index of the second inorganic protective layer.

8. The display device of claim 6, wherein a refractive index of at least one of the at least two layers of the lower anti-reflective layer is lower than a refractive index of the first inorganic protective layer, and
wherein a refractive index of at least one of the at least two layers of the upper anti-reflective layer is lower than a refractive index of the second inorganic protective layer.

9. The display device of claim 1, further comprising a diffusion sheet and a prism sheet above the wavelength conversion layer.

10. The display device of claim 1, wherein the at least two layers of the lower anti-reflective layer comprises a first lower anti-reflective layer, a second lower anti-reflective layer under the first lower anti-reflective layer and a third lower anti-reflective layer under the second lower anti-reflective layer, and
wherein the at least two layers of the upper anti-reflective layer comprises a first upper anti-reflective layer, a second upper anti-reflective layer above the first upper anti-reflective layer and a third upper anti-reflective layer above the second upper anti-reflective layer.

11. The display device of claim 1, wherein the upper and lower anti-reflective layers each include at least three layers,
wherein refractive indices of the three layers of the lower anti-reflective layer are different from each other, and
wherein refractive indices of the three layers of the upper anti-reflective layer are different from each other.

12. The display device of claim 11, wherein the at least three layers of the lower anti-reflective layer comprise a first lower anti-reflective layer, a second lower anti-reflective layer and a third lower anti-reflective layer,
wherein the at least three layers of the upper anti-reflective layer comprise a first upper anti-reflective layer, a second upper anti-reflective layer and a third upper anti-reflective layer,
wherein a distance between the upper substrate and the first upper anti-reflective layer is less than a distance between the upper substrate and the second upper anti-reflective layer and a distance between the upper substrate and the third upper anti-reflective layer, and
wherein a distance between the lower substrate and the first lower anti-reflective layer is less than a distance between the lower substrate and the second lower anti-reflective layer and a distance between the lower substrate and the third lower anti-reflective layer.

13. The display device of claim 1, wherein at least one of the first upper anti-reflective layer and the second inorganic protective layer is directly on the upper substrate,
wherein at least one of the first lower anti-reflective layer and the first inorganic protective layer is directly on the lower substrate,
wherein the second lower anti-reflective layer is in direct physical contact with the first lower anti-reflective layer,
wherein the third lower anti-reflective layer is in direct physical contact with the second lower anti-reflective layer,
wherein the second upper anti-reflective layer is in direct physical contact with the first upper anti-reflective layer,
wherein the third upper anti-reflective layer is in direct physical contact with the second upper anti-reflective layer,
wherein the upper substrate is thicker than the first upper anti-reflective layer and the first inorganic protective layer, and
wherein the light guide plate is thicker than the optical member.

* * * * *